2,988,482
PRODUCT AND METHOD FOR PRODUCING CLINICAL DEXTRAN INCLUDING IONIZABLE CALCIUM
Leo J. Novak and Everette E. Witt, Dayton, Ohio, assignors to The Commonwealth Engineering Company of Ohio, Dayton, Ohio
No Drawing. Filed Oct. 15, 1956, Ser. No. 615,772
7 Claims. (Cl. 167—78)

This invention relates to a clinical dextran which does not prolong the normal bleeding time when injected intravenously, and to methods for preparing it.

"Clinical dextran" (herein referred to as Dextran Blood Plasma Expander or Dextran BPE) is a 6% aqueous solution of dextran having a stipulated molecular weight range and otherwise meeting the specifications established by The Military Medical Purchase Description, Dextran Injection M-1 6%.

The dextran used in preparing clinical dextran is usually obtained by incubating a sucrose-bearing nutrient medium inoculated with a culture of a dextran-synthesizing strain of Leuconostoc (or with the enzyme elaborated by the bacterium), precipitating the "native" dextran from the fermentate, and hydrolyzing the high molecular weight native material to a molecular weight in the specified range. The hydrolyzed dextran is subjected to various purifying treatments, including fractional precipitation and passage of an aqueous solution thereof through ion exchange resins which frequently comprise organic polymer sulfonates. The 6% aqueous solution of the de-ionized dextran is then bottled and sterilized.

It is known that clinical dextran prepared as described and available heretofore, causes an increase in the normal bleeding time when it is injected intravenously for the prevention or relief of shock during surgery. The normal bleeding time is about 1 to 2½ minutes. The intravenous injection into a human being or into an animal of from 1 to 6 liters of the clinical dextran available prior to this invention in a single dose or over a 5-day period can cause prolongation of the normal bleeding time to ten minutes and, in some instances, to as long as thirty minutes.

This tendency of the known clinical dextran to prolong the normal bleeding time has been reported by Carbone et al. (Proc. Soc. Expt. 1, Biol. Med. 85, 101, 1954; 90, 68 1955); Seegers et al. (J. Applied Physiology 7, 617, 1955); Semple (Am. Jr. Physiol. 176, 113, 1954); Rice (Canadian Jr. Pub. Health, 45, 264, 1954) and Horvath (Jr. Applied Physiol. 7, 614, 1955). It has also been established by experiments carried out under our direction. In those experiments, rabbits were injected with dosages of clinical dextran calculated as equivalent to 6 liters of the 6% dextran solution for a 70 kg. (150 lb.) man, the dextran solution being injected in 3 equal doses over a 3-day period. The procedure is to puncture a selected "vascular-free" area of the injected rabbit after a given time has elapsed following the injection and observe the bleeding time. Different areas of the ear are punctured after varying time periods following the injection have elapsed. Thus a puncture may be made one hour after the injection and the bleeding time observed, and then a fresh puncture made, in another area of the ear, 5 hours after the injection, and so on. The normal bleeding time is observed by puncturing a vascular-free area of the ear of the rabbit before the injection.

In a typical experiment, a normovolemic rabbit weighing 3.0 kg. was injected with two doses of conventional clinical dextran as available heretofore, each dose consisting of 80 ccs. The doses are designated 1 and 2 respectively in Table I below, which shows the bleeding time in minutes after the indicated time intervals following each of the injections. Injections 1 and 2 were each administered over a 30-minute period.

TABLE I

|  | 0 hr. | 1.5 hr. | 3.0 hrs. |
|---|---|---|---|
| (1) | 2'75" |  |  |
| (2) | 3'75" | 3'5" | 5' |

The normal bleeding time for a rabbit of the same weight which was not injected with the clinical dextran was 1 minute.

The results of similar tests in which a normovolemic rabbit weighing 3.4 kg. was given three injections (100 cc. each dose) of the clinical dextran available heretofore and prepared to satisfy the military requirements identified above are set forth in Table II. The duration of the third injection of this series was 120 minutes, the first two being given in 30 minutes each.

TABLE II

|  | 0 hr. | 1.5 hrs. | 3.0 hrs. | 4.0 hrs. | 8.0 hrs. | 24 hrs. |
|---|---|---|---|---|---|---|
| (1) | 8'5" |  |  | 6' |  | 2' |
| (2) | 2' | 6' | 5'5" |  |  | 3'25" |
| (3) | 16' |  | 16'5" |  |  | 20' |

The normal bleeding time for a rabbit of the same weight, not given the infusion of the known, previously available clinical dextran was about one minute.

The injection of 80 ccs. of the known clinical dextran over a period of 30 minutes into a rabbit weighing 3.1 kg. resulted in the bleeding times shown (in minutes) in Table III.

TABLE III

| 0 hr. | 1.5 hrs. | 3.0 hrs. |
|---|---|---|
| 1'5" | 2' | 4' |

The rabbit used in this test was found dead on the morning following the clinical dextran infusion.

As will be noted from the tables given, the bleeding time was prolonged for those rabbits injected with the clinical dextran available up to now. The results with rabbits are the same as those which have been observed and reported with human beings.

The precise reasons for this prolongation of the bleeding time in both human beings and animals into whom the clinical dextran available heretofore has been injected intravenously, which has been widely observed and reported, and which has proved a deterrent to more widespread use of such clinical dextran despite its other known merits, are not entirely clear.

It is clear that, during the first 24 hours after the injection of, for instance, 1500 cc.–2000 cc. of the clinical dextran for shock prevention or pre- or post-surgical treatment, where no more than 50% of the dextran is excreted in the urine, the blood volume of the normal weight patient may be increased by at least some 20–24%, calculated on the basis of the 6% dextran solution injected and the expansion of the blood volume due to blood osmatic increase in the vascular bed from the dextran.

During this hemo-dilution period (first 24 hours after the injection) the bleeding time and blood coagulation time should decrease, proportionately to the dilution of the recognized blood components concerned with bleeding and blood coagulation time. Such components are: thrombin, prothrombin, ionizable calcium, anti-thrombin, fibrinogen, fibrin, thromboplastin (tissues and platelets).

However, as noted, the normal bleeding time is increased during the 24-hour period after injection of the clinical dextran heretofore available.

It is to be noted that in the preparation of clinical dextran, as noted above, and prior to spray-drying of an aqueous solution of the hydrolyzed dextran to obtain a powder, the solution is passed through ion exchange resins which comprise organic polymer sulfonates. It is possible for trace amounts of these sulfonates to exist in the final bottled clinical dextran even though it gives a negative sulfate test with barium chloride as required by the specifications for clinical dextran.

The solubility of barium sulfate is between 0.1 and 0.3 milligram per 100 ccs. of water. In an amount of clinical dextran equal to a 1500 cc. injection dose, therefore, the soluble ion exchange resin sulfonate content could be between 1.5 and 3.0 milligrams equivalent to barium sulfate and not give a positive sulfate test. It could meet the specifications for clinical dextran with barium chloride and still contain trace amounts of the sulfonate and these could, in turn, be responsible for the prolonged bleeding time, since organic, electro-negative (acidic) sulfate is a strong blood anti-coagulant.

Also, the clinical dextran (solution of hydrolyzed dextran) has a pH above 7.0. However, after bottling, the material is sterilized and the sterilization results in a drop in pH which may be as high as 2.0 pH units. This signifies the formation of considerable hydrogen ion, reflecting the formation of carboxylic acid (COOH) groups.

Such acids as are prototyped by formic, oxalic, lactic, pyruvic, malonic, succinic, citric or gluconic acids may be formed in minute amounts when the clinical dextran is sterilized, due to oxidative degradation of the dextran during the sterilization. It is known that those mono-, di-, and tri-carboxylic electro-negative acids can inhibit the blood coagulating mechanism. For example, citrates combine with ionizable calcium in the blood, preventing the specific blood coagulation sequence from taking place. All of the acids mentioned have, to a greater or less extent, the capacity to combine with calcium in the blood to form salts which are either insoluble or which are soluble but "tie up" the calcium so that sufficient calcium ions are not available in the bloodstream to activate prothrombin to form the thrombin which, by reaction with fibrinogen yields fibrin, the principal functional factor in blood coagulation. The presence of such acids in the clinical dextran, and injection of the clinical material at pH on the acid side, would inevitably lower the ionizable calcium content of the blood so that prolonged bleeding time would result.

Whatever may be the full explanation for the observed prolongation of the bleeding time, it is a serious problem which has not heretofore been solved.

An object of this invention is to provide a clinical dextran that does not prolong the normal bleeding time.

Another object is to provide a method of treating clinical dextran so that, after the treatment, it can be injected intravenously without increasing the normal bleeding time.

The objects of this invention are accomplished by treating the 6% aqueous solution of hydrolyzed dextran of the approved molecular weight and which has been pretreated in the usual way so that it is pyrogen-free, non-anaphylactic and non-antigenic, with a pure, physiologically harmless calcium salt that is soluble or insoluble in the dextran solution. Various calcium salts can be used, including calcium carbonate, calcium phosphate, calcium hydroxide, calcium lactate, calcium levulinate and other basic calcium salts. The bulk of our work has been done with calcium carbonate, and either calcium carbonate or calcium phosphate is the preferred ionizable calcium salt for use in the practice of this invention.

The treatment is carried out in a very simple manner by mixing the calcium salt with the aqueous dextran solution, shaking or stirring the mixture to insure uniform mixing of the salt in the solution, which may require a minute or so, or a longer time up to about one hour, and allowing the mixture to stand for settling of the insolubles. The mixture is then filtered, preferably under aseptic conditions, and without introducing antigenic, pyrogenic or other deleterious substances into the solution. We have found an E O Ertel Pad which was pre-treated by washing with dilute hydrochloric acid, then with pyrogen-free water, eminently satisfactory for use in filtering the mixture, but other types of filters as may be available to those practicing this art can be used.

The treatment with the calcium salt increases the pH of the aqueous dextran solution, the filtrate obtained as described above having a pH above 7.0 and usually between 8.0 and 8.5.

The following examples are illustrative of clinical dextrans prepared according to the invention. In these examples the clinical dextran used had been purified, including de-ionization, spray-drying and sterilization prior to the treatment with the calcium salt.

*Example I*

500 ccs. of the clinical dextran BPE were placed in a container and 50 gms. of C.P. calcium carbonate were added. The mixture was allowed to stand for one hour and then filtered aseptically through an EO pad. The pH of the filtrate was 8.8. It was filtered through a silk screen. The oxalate test for Ca was negative. The solution was bottled and sterilized. After sterilization the pH was 6.65.

Forty ccs. of the sterile solution were injected intravenously into rabbits. The "normal" bleeding time for the rabbits was determined prior to injection with the clinical dextran, by puncturing a selected "vascular-free" area of the ear with a Bard-Parker #11 blade, and noting the time required for cessation of the bleeding. After injection of the calcium salt treated clinical dextran, other punctures were made at different vascular-free areas of the ear, at different time intervals following the injection, up to 24 hours, and the bleeding time was observed. The normal bleeding time was not increased as a result of the injection.

*Example II*

Two batches of 500 milliliters (each) of clinical dextran prepared in the conventional way, deionized and sterilized were each agitated with 20 gms. of calcium carbonate, and the mixtures were allowed to stand for one hour. They were then filtered through an EO Ertel pad and combined. Samples were bottled (1) before any pH adjustment and (2) after adjustment to pH 7.5 with hydrochloric acid, and sterilized. The pH was measured and compared with that of a sterile clinical dextran which had not been treated with the calcium salt, as shown in Table IV below.

TABLE IV

| Sample | Vol., Ml. | Before sterilization | After sterilization |
|---|---|---|---|
| 1 | 300 | 8.4 | 6.9 |
| 2 | 325 | 7.5 | 6.8 |
| Control | 500 | | 6.0 |

It is apparent that the treatment with the calcium salt does not produce as marked a drop in pH of the solution as is observed after sterilization of the conventional clinical dextran not treated with an ionizable calcium salt.

Example III

Samples 1 and 2 of Example II were injected into rabbits under the conditions described in Example I, and the bleeding time was observed and compared with that for a rabbit injected with the same quantity of the control (conventional) clinical dextran. The results are shown in Table V.

TABLE V

| Sample | Before injection | Bleeding time | | | |
|---|---|---|---|---|---|
| | | 1 hr. | 1¼ hr. | 1½ hr. | 24 hrs. |
| 1 | 2'30" | 2'45" | | | 1'10" |
| 2 | 1'45" | | 1'9' | | 1'15" |
| Control | 2'40" | | | 4'35" | 4'27" |

[1] Adjustment of the pH downward from 8.4 to 7.5 with HCl after the first sterilization but prior to the re-sterilization increased the normal bleeding time and did not prevent the bleeding time increase that has been found with the conventional clinical dextran.

Example IV 1200 milliliters of clinical dextran BPE were agitated for about one hour with an excess of calcium carbonate. The carbonate was allowed to settle and the mixture was filtered through an EO pad. The filtrate was sterilized and bottled (four bottles; 300 ml. each bottle). The pH before and after sterilization was determined, and is shown in Table VI.

TABLE VI

| Sample | pH Before Sterilization | pH After sterilization |
|---|---|---|
| 1 | 8.4 | 6.4 |
| 2 | Adjusted to 7.5 from 8.4 [1] | 6.3 |
| 3 | 8.4 | [2] 6.3 |
| 4 | 8.4 | [2] 6.3 |
| Control | | 5.5 |

[1] With HCl.
[2] After the sterilization the pH was adjusted to 8.1 and 7.4, respectively, by treatment with 10% NaOH and saturated Ca(OH)₂ respectively, under aseptic conditions.

The pH of the samples treated with calcium carbonate increased rapidly when the sterilized cooled solutions were removed from the bottles, as shown below, in Table VII.

TABLE VII

| Sample | Time after Removal from Bottles, in minutes | | |
|---|---|---|---|
| | pH 1" | pH 5" | pH 20" |
| 1 | 6.4 | 6.8 | 7.2 |
| 2 | 6.3 | | |
| 3 | 6.3 | 6.8 | 7.1 |
| 4 | 6.3 | 6.8 | 7.1 |
| Control | 5.5 | | 5.6 |

The values shown in Table VII represent careful pH observations with clean equipment, the same results being obtained on two different pH meters, and constitute chemical evidence that the clinical dextran is changed by the calcium salt treatment.

The increase in pH of the solution after opening of the bottle, together with the values given in Example II, indicates that the calcium salt treatment permits the formation of some substance (not presently identified) which partially decomposes with the oxygen in the bottle air over the dextran during or after sterilization, resulting in the increase in pH when the bottle is opened.

Example V

Tests were carried out to determine the effects of multiple sterilization of conventional dextran BPE on the bleeding time when injected intravenously.

Aseptically, 1000 ml. of clinical (sterilized) dextran BPE were adjusted, to pH 8.5 with a dilute solution of NaOH in pyrogen-free water. The 1000 ml. were then sterilized at 15 p.s.i. for 15 minutes.

This represents a second sterilization since the material was sterilized once during the original preparation. 250 ml. of the solution were filled into a vacuum storage flask (1), and the remainder of the material again adjusted, aseptically, to pH 8.5 with NaOH and sterilized at 15 p.s.i. for 15 minutes. This represents a third sterilization for the material.

250 ml. of the dextran BPE sterilized a third time were filled into a vacuum storage flask (4), and the contents of both flasks (1) and (4) were injected intravenously into rabbits under the conditions described in Example I. The bleeding times were observed for a control sample of BPE sterilized once, No. (1) sterilized twice and No. (4) sterilized three times and shown in Table VIII.

TABLE VIII

[Bleeding time, minutes]

| No. of Sterilizations | Before Injection | After Injection | | |
|---|---|---|---|---|
| | | 1.5 hrs. | 3 hrs. | 24 hrs. |
| 1 | 2'40" | 4'35" | | 4'27" |
| 2 | 1' | | 4'15" | 1'7" |
| 3 | 1'10" | | 6' | 2'50" |

It is to be noted that neutralization of the conventional clinical dextran with sodium hydroxide does not eliminate the problem of increased bleeding time. Repeated sterilization of the conventional clinical dextran did not eliminate the bleeding time problem but rather tended to further prolong the normal bleeding time.

The calcium salt treatment is also effective when carried out prior to any sterilization of the clinical dextran as shown in Example VI. Only one sterilization of the material is required.

Example VI 500 mls. of a 6% aqueous solution of purified deionized dextran which had not been sterilized was agitated with 50 gms. of the pure calcium carbonate, allowed to stand for settling, and filtered aseptically through an EO pad, bottled, and sterilized. It was injected (pH 6.9) aseptically into a rabbit as described in Example I, the bleeding time (1) shown in Table IX being observed, and compared with those (2) observed for a rabbit of similar weight injected intravenously with the same amount of clinical dextran BPE but which had not been treated with the calcium salt.

TABLE IX

| | Bleeding time | | |
|---|---|---|---|
| | 0 hr. | 2 hrs., 25 min. | 24 hrs. |
| (1) | 2'30" | 1'10" | 1'10" |
| (2) | 2'40" | 4'35" | 4'27" |

The calcium salt treatment is effective to eliminate the increase in normal bleeding time, whether it is performed after the usual purifying, including de-ionizing treatments and prior to any sterilization, or intermediate the initial sterilization and a resterilization of the solution. Although there is a drop in the pH of the re-sterilized product, the pH thereof is higher than that of the conventional material and, in any event, the re-sterilized material that has been treated with the calcium salt does not prolong the bleeding time. Our investigations indicate that the treatment with the calcium salt is specific. More than mere neutralization is involved since neutralization of conventional clinical dextran with sodium hydroxide does not give the same effects.

Although there is evidence, as shown from the examples and test results above, that the treatment with the calcium salt, specifically calcium carbonate or calcium phosphate, removes blood anticoagulants from the sterilized clinical dextran or prevents formation thereof during the sterilization, since the pH increase noted when the bottle containing the sterilized calcium salt-treated material is not noted in the case of the clinical dextran not subjected to the calcium salt treatment, it is also the fact that ionizable calcium specifically is required for blood coagulation and that our clinical dextran after treatment with the calcium salt does not increase the bleeding time. This latter fact suggests that the calcium enters into combination with the dextran to introduce ionizable calcium into the blood stream when the material is injected.

The amount of calcium salt mixed with the aqueous dextran solution can be varied somewhat and can be between 10 gms. and 50 gms. per 1000 ccs. of the solution. Usually an excess of the calcium salt is used, at ordinary temperatures.

This invention solves the perplexing problem of increased bleeding time, therefore, which has hampered the use of clinical dextran. The problem has not been solved by methods utilizing calcium salts for precipitating dextran hydrolyzate from a hydrolytic medium in which native dextran has been hydrolyzed, to isolate the dextran of accepted and approved clinical molecular weight therefrom. When the clinical dextran obtained by those methods is injected intravenously, it induces the increase in bleeding time. Like the hydrolyzates precipitated by other means, such as aliphatic alcohols and ketones, the dextran hydrolyzates precipitated from the hydrolytic medium by means of calcium salts has to be passed through the ion exchange resins and sterilized before it is injected.

Since some changes can be made in carrying out the method, as described, without departing from the spirit and scope thereof, it is intended that the invention will not be limited except as defined in the appended claims.

What is claimed is:

1. A method for obtaining clinical dextran in a condition in which it does not prolong the normal bleeding time when it is injected intravenously, which comprises mixing clinical dextran which is pyrogen-free, non-anaphylactic, non-antigenic, has been de-ionized by means of ion-exchange resins, and does not contain ionizable calcium, but which does prolong the normal bleeding time, with a physiologically harmless, ionizable, basic calcium salt and which is selected from the group consisting of calcium carbonate, calcium phosphate, calcium hydroxide, calcium lactate and calcium levulinate, said calcium salt being present in an amount of 10 gms. to 50 gms. of the salt per 1000 ccs. of the clinical dextran at ordinary temperature and with agitation, allowing the mixture to stand for settling, and filtering the same to obtain, as filtrate, the clinical dextran in a condition in which it comprises ionizable calcium and does not prolong the normal bleeding time.

2. A method for obtaining clinical dextran in a condition in which it does not prolong the normal bleeding time when it is injected intravenously, which comprises mixing clinical dextran which is pyrogen-free, non-anaphylactic, non-antigenic, has been de-ionized by means of ion-exchange resins, and does not contain ionizable calcium, but which does prolong the normal bleeding time, with calcium carbonate in an amount of 10 gms. to 50 gms. of the salt per 1000 ccs. of the clinical dextran at ordinary temperature and with agitation, allowing the mixture to stand for settling, and filtering the same to obtain, as filtrate, the clinical dextran in a condition in which it comprises ionizable calcium and does not prolong the normal bleeding time.

3. A method for obtaining clinical dextran in a condition in which it does not prolong the normal bleeding time when it is injected intravenously, which comprises mixing clinical dextran which is pyrogen-free, non-anaphylactic, non-antigenic, has been de-ionized by means of ion-exchange resins, and does not contain ionizable calcium, but which does prolong the normal bleeding time, with calcium phosphate in an amount of 10 gms. to 50 gms. of the salt per 1000 ccs. of the clinical dextran at ordinary temperature and with agitation, allowing the mixture to stand for settling, and filtering the same to obtain, as filtrate, the clinical dextran in a condition in which it comprises ionizable calcium and does not prolong the normal bleeding time.

4. In a method for obtaining clinical dextran which does not prolong the normal bleeding time when it is injected intravenously, the steps which comprise spray-drying a clinical dextran which is non-pyrogenic, non-anaphylactic, non-antigenic, has been de-ionized by means of ion-exchange resins, and does not contain ionizable calcium but which does prolong the normal bleeding time, to obtain the dextran contained therein in the form of a powder, mixing the powder with water to obtain a 6% solution of the dextran, mixing the solution with a physiologically harmless, basic, ionizable calcium salt and which is selected from the group consisting of calcium carbonate, calcium phosphate, calcium hydroxide, calcium lactate and calcium levulinate, said calcium salt being present in an amount of 10 gms. to 50 gms. per 1000 ccs. of the solution at ordinary temperature and with agitation, allowing the mixture to stand for settling, filtering the same to obtain, as filtrate, the clinical dextran in a condition in which it comprises ionizable calcium and does not prolong the normal bleeding time, and sterilizing the filtrate.

5. In a method for obtaining clinical dextran which does not prolong the normal bleeding time when it is injected intravenously, the steps which comprise spray-drying a clinical dextran which is non-pyrogenic, non-anaphylactic non-antigenic, has been de-ionized by means of ion-exchange resins, and does not contain ionizable calcium but which does prolong the normal bleeding time, to obtain the dextran contained therein in the form of a powder, mixing the powder with water to obtain a 6% solution of the dextran, mixing the solution with calcium carbonate, in an amount of 10 gms. to 50 gms. per 1000 ccs. of the solution at ordinary temperature and with agitation, allowing the mixture to stand for settling, filtering the same to obtain, as filtrate, the clinical dextran in a condition in which it comprises ionizable calcium and does not prolong the normal bleeding time, and sterilizing the filtrate.

6. In a method for obtaining clinical dextran which does not prolong the normal bleeding time when it is injected intravenously, the steps which comprise spray-drying a clinical dextran which is non-pyrogenic, non-anaphylactic, non-antigenic, has been de-ionized by means of ion-exchange resin, and does not contain ionizable calcium but which does prolong the normal bleeding time, to obtain the dextran contained therein in the form of a powder, mixing the powder with water to obtain a 6% solution of the dextran, mixing the solution with calcium phosphate in an amount of 10 gms. to 50 gms. per 1000 ccs. of the solution at ordinary temperature and with agitation, allowing the mixture to stand for settling, filtering the same to obtain, as filtrate, the clinical dextran in a condition in which it comprises ionizable calcium and does not prolong the normal bleeding time, and sterilizing the filtrate.

7. A clinical dextran product useful for intravenous injection which includes ionizable calcium and produced as set forth in claim 1.

References Cited in the file of this patent

UNITED STATES PATENTS 2,565,507 Lockwood et al. _____ Aug. 28, 1951
2,685,579 Wimmer _____ Aug. 3, 1954

FOREIGN PATENTS 121,752 Sweden _____ May 25, 1954
158,329 Australia _____ Aug. 19, 1954
165,038 Australia _____ Sept. 6, 1954

OTHER REFERENCES

Jeanes et al.: J. Biol. Chem., November 1948, pages 603–615.

Carbone: Proc. Soc. Exp. Biol. & Med. January 1954, vol. 85, pages 101–103.